US005609729A

United States Patent [19]
Clarke-Pounder et al.

[11] Patent Number: 5,609,729
[45] Date of Patent: Mar. 11, 1997

[54] APPARATUS FOR CONTROLLING LIQUID LEVEL IN A KNOT DRAINER

[75] Inventors: Ian J. H. Clarke-Pounder; Douglas L. G. Young, both of Nashua, N.H.

[73] Assignee: Beloit Technologies, Inc., Wilmington, Del.

[21] Appl. No.: 396,095

[22] Filed: Feb. 28, 1995

Related U.S. Application Data

[60] Continuation of Ser. No. 991,606, Dec. 16, 1992, abandoned, which is a division of Ser. No. 780,675, Oct. 21, 1991, Pat. No. 5,209,822.

[51] Int. Cl.⁶ .................................................. D21H 23/00
[52] U.S. Cl. .................................... 162/380; 162/252
[58] Field of Search .................................. 210/744, 104, 210/109, 97; 209/258, 268, 273, 17, 270; 162/55, 380, 262, 263, 261, 252

[56] References Cited

U.S. PATENT DOCUMENTS

| | | | |
|---|---|---|---|
| 2,463,526 | 3/1949 | Dickson | 210/744 |
| 4,317,731 | 3/1982 | Roberts, Jr. et al. | 210/104 |
| 4,343,708 | 8/1982 | Rantanen et al. | 210/744 |
| 4,407,718 | 10/1983 | Pollock | 210/744 |
| 5,104,553 | 4/1992 | Lorenz et al. | 210/104 |
| 5,143,220 | 9/1992 | Young et al. | 209/270 |

*Primary Examiner*—Brenda A. Lamb
*Attorney, Agent, or Firm*—Dirk J. Veneman; Raymond W. Campbell

[57] ABSTRACT

A screen aperture blinding prevention and liquid overflow prevention and level control apparatus for a knot drainer senses liquid level within the knot drainer and compares the sensed level to a setpoint level. Differences in the two levels generate control signals of appropriate magnitude and direction, and those control signals are transmitted to a valve whose degree of responsiveness and openness is adjusted to change the outflow rate of accepts liquor from the accepts chamber of the rejects separator. In addition, passive level control is provided in the discharge line for establishing accept flooded screen apertures regardless of variations of inflow and outflow rates during operation while active level control to create accept flow rate greater than, less than, or equal to inlet flow rate is provided by the combination of siphonic loop, barometric leg and control values for accepts outflow and for backwash nozzle flow. Continuous flow of fiber and liquid through separating screen apertures is appropriately supervised by monitoring accepts chamber pressure.

6 Claims, 2 Drawing Sheets

APPARATUS FOR CONTROLLING LIQUID LEVEL IN A KNOT DRAINER

This application is a continuation of application Ser. No. 07/991,606, filed Dec. 16, 1992 now abandoned which is a division of application Ser. No. 07/780,675 filed Oct. 21, 1991, now U.S. Pat. No. 5,209,822.

BACKGROUND OF THE INVENTION

This invention relates generally to rejects separators for fibrous slurries produced by cooking cellulose material such as wood and more particularly to liquid level control method and apparatus for sealed knot separators and knot drainers in a paper pulpmaking operation.

In a pulp mill, a small fraction of the pulp stream consists of undigested wood chips called knots. These knots must be removed from the pulp during processing to negate contamination of the finished pulp with undesirable woody type material. For this purpose, a knot separator is used which may be a one stage system for a low capacity mill or, more commonly, since high capacity knotters reject a considerable amount of good fiber with the knots, a two stage system wherein the rejected knots and fiber from the first stage high capacity knotters are separated again in the secondary or reject stage knot drainer. The two stage system permits a higher capacity operation while, at the same time, improving the efficiency of knot separation from good fiber and knot removal. This improved accuracy results in a decrease in the amount of pulp liquor and fiber being discharged with the knots.

The primary high capacity knotter operates under pressure. It removes the knots from the main pulp stream and concentrates them in a relatively low volume, low consistency rejects flow of concentrated knots with fiber and liquor. The second stage rejects separator drains the pulp fiber and liquor away from the knots, washes adhered fiber off the knots, and rejects fiber free damp knots to a knot tank. This simplifies knot reprocessing or disposal and conserves pulp fiber, liquor and contained chemicals and minimizes undesirable environmental discharges.

A secondary rejects separator or knot drainer is open to the atmosphere through the rejects discharge outlet. Feed rate to the knot drainer is determined by the knot content of the cooked pulp and the operation of the pulp system and is subject to wide fluctuations. It is, therefore, possible for the knot drainer to either overflow or "run dry", depending upon the feed flow rate of knots, fiber, and liquor in combination. The knot drainer does not actually run dry, but this terminology is used to describe a condition which occurs due to the differential pressure (i.e., delta P) across the screen basket reaching a level at which the inlet side of the apertures in the screen basket are incipiently blinded over and thus fiber and/or liquor incipiently ceases to flow through the apertures at which point the liquid level in the accepts chamber of the knot drainer may, if not maintained full, fall below the top of the separating screen basket and allow the ingress of air into the accepts compartment thereby maximizing delta P. This will cause blinding off of the separating screen basket apertures and may require shutdown of the knot drainer for cleanout and the shutdown of the entire pulping line during the cleanout period. The loss of production due to running dry and the loss of fiber and pulp liquor due to overflow are significant economic risks.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a liquid level control apparatus for a knot drainer which provides for sensing apparent inlet liquid level within the knot drainer, for comparing the sensed inlet liquid level to a set point inlet liquid level, and for transmitting a signal having an appropriate sign and a magnitude proportional to the difference, if any, between the sensed level and the set point level, and an apparatus, responsive to the transmitted signal, for regulating the outflow rate of accepts liquor from the knot drainer.

The foregoing and other aspects will become apparent from the following detailed description of the invention when considered in conjunction with the accompanying drawing figures.

DETAILED DESCRIPTION

Figure 1:
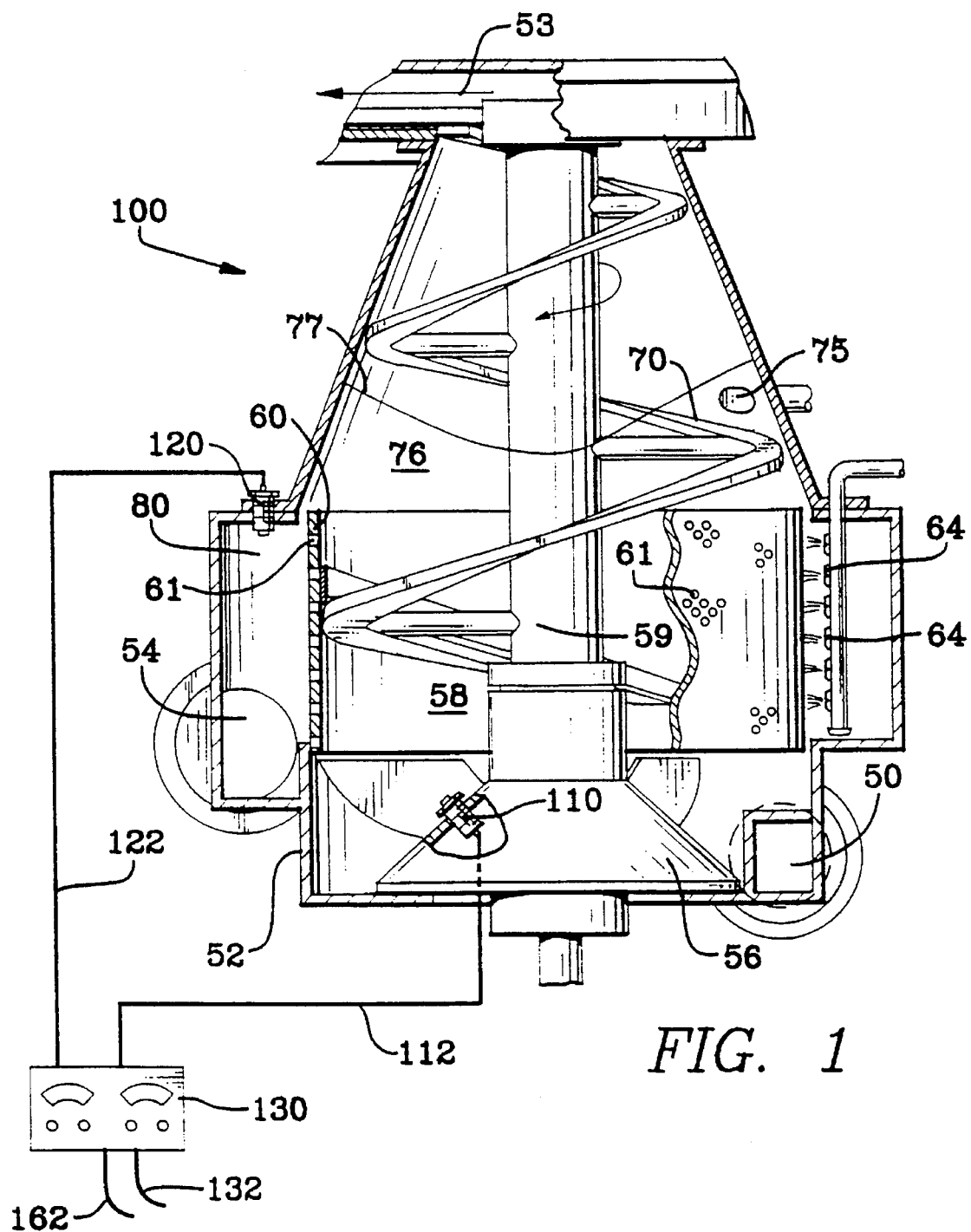
FIG. 1 is a schematic cross sectional elevation view showing the general layout of an advanced design rejects separator incorporating features of the present invention.
Figure 2:
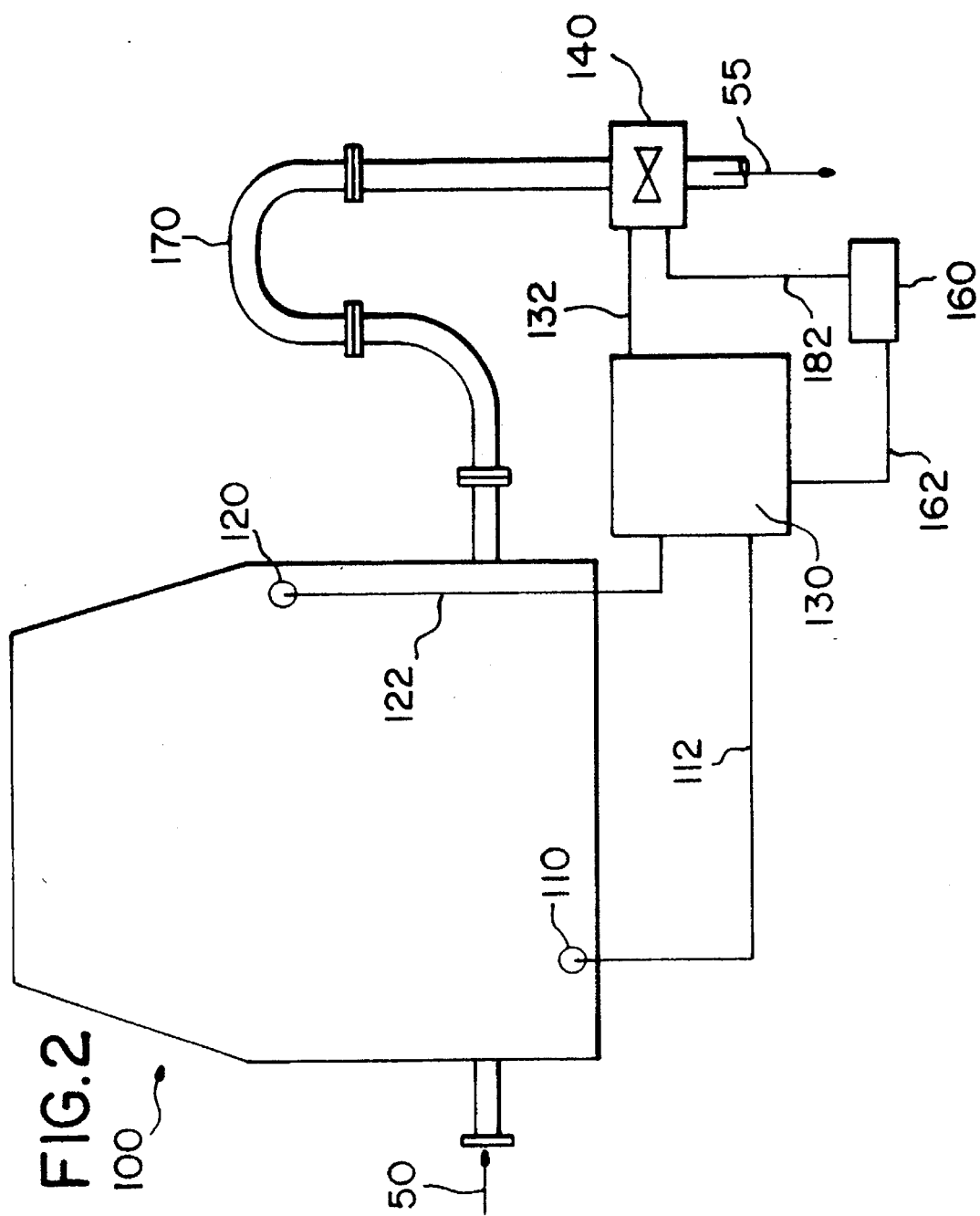
FIG. 2 is a schematic diagram indicating interconnection of sensing and control features of the present invention.

Referring to FIG. 1, operation of a rejects, or knot, drainer 100 can be understood. The example shown is a vertical drainer in which the knot bearing slurry is fed into the knot drainer 100 through feed inlet 50. It passes axially upward through screening chamber 58 in which the majority fraction of the acceptable fiber passes through apertures 61 of coarse screen 60 into accepts chamber 80 from which it is discharged through accepts discharge outlet 54. At the same time, the knots, unable to pass through screen apertures 61, encounter conveyor screw flight 70 which is rotating with shaft 59 and which propels the knots upward through a washing region 76 which lies between screening chamber 58 and liquid level vortex 77. Preferably, just below the surface of liquid level vortex 77 are knot washing liquor injection nozzles 75, which introduce fiber free wash liquor. This liquor removes any adhering fiber from the knots by liquid scouring due to the relative motion between knot and wash liquor. Once above liquid level vortex 77, the knots are further drained of liquid by centrifugal force and gravity and are finally swept into knot discharge outlet 53 and may be, for example, collected in a knot tank which is not shown. To this point, the description has been of the operation of a standard advanced design rejects separator. Features of the screen basket aperture blinding prevention and overflow control system of the present invention applicable to the advanced design rejects separator and other similar, generally vertical, cylindrical screenplate, knot conveyor type separators are best illustrated by reference to FIGS. 1 and 2.

Liquid level in a rejects drainer is a function of feed flow rate, knot washing liquid flow rate, accepts discharge flow rate, accepts pressure, screen aperture entrance blinding, and knot discharge. Feed flow rate is determined by the operating characteristics of the pulp line in which the rejects separator is located. Therefore, feed flow rate to the rejects separator is subject to wide fluctuation and cannot be constrained without a danger of upsetting the pulp line operation. Knot washing or elutriation flow rate is manually set in order to assure effectiveness in removing fiber from the upwardly travelling knots. Knot discharge varies with the degree and thoroughness of the cooking process and excluding hard cooks (excessive knot content) and other than in the case of excessive and abnormally high knot content in the digested pulp due to cooking upset, has very little effect on liquid level within the rejects drainer. Therefore, the most practical means for maintaining the accept side of the screen apertures 61 flooded within a rejects drainer is by controlling the accepts chamber submergence by level and/or pressure and the accepts discharge flow rate.

The level control system of the present invention provides a liquid level limiter in the form of a siphonic loop 170 which provides for flooding the accept side of the screen by means of ensuring a minimum liquid level during startup and other transient flow operating conditions. This operates similarly to a drain trap and is a passive or static level limiting device.

A liquid level sensor 110 is mounted on or near the bottom of the housing of the rejects separator 100 on the inlet side of the screen 60 for example against shaft base 56. Sensor 110 monitors the apparent level of liquid vortex 77 and transits a signal of appropriate magnitude through wires 112 to liquid level control signal processor 130. Accepts chamber pressure sensor 120 monitors pressure and provides an indication of the apparent liquid level (or head) and/or overpressure within the accepts chamber 80. Accepts pressure sensor 120 transmits a signal through wires 122 to signal processor 130.

Liquid level control signal processor 130 transmits control signals through control signal wires 132 and 162. These signals actuate and regulate the degree of openness or closure of accepts outflow control valve 140, and, when appropriate, trigger accepts chamber low level alarm 160.

The combination of siphonic loop 170, barometric leg 55, and accepts outflow control valve 140 maintains accepts chamber 80 flooded while preventing overflow of the separator by rapidly absorbing inlet flow surges. Since accepts outflow capacity exceeds inlet flow capacity, adjustments of openness of valve 140 in response to sensed apparent inlet liquid level changes result in immediate increase or decrease of accepts chamber pressure due to increased or decreased siphoning action caused by increased or decreased fluid flow through valve 140 and barometric leg 55.

The barometric piping of accepts discharge 55 has a higher flow capacity capability than does feed flow inlet 50 and is sized to create relatively low accept chamber pressure surges to enhance the absorption of increased inlet flow surges while maintaining the screen flooded. This assures that there is sufficient accepts flow capacity to handle any instantaneous increased feed flow which may come from the pulp line. This "excess" flow absorption capability permits accepts outflow control valve 140 to be operated at a partially open condition and to increase or decrease its openness in response to increases or decreases of liquid level 77, as sensed by liquid level sensor 110. Thus, liquid inlet level control is primarily achieved through the combination of siphonic loop 170, barometric leg 55, and accepts outflow control valve 140 whose openness is modulated in response to signals from liquid level signal processor 130 which counteract liquid level changes as measured and signalled by level sensor 110. Knot washing or elutriation flow rate is determined by the requirements for fiber removal and is not adjustable for liquid level control purposes.

Accepts chamber 80 must be maintained full of liquid at all times. This is to avoid an excessive pressure drop across screen 60 due to the accepts side of apertures 61 not being flooded, which could result in blinding the inlet side of the screen apertures 61 with an impermeable mat of pulp and knots due to centrifuging effect. Such blinding would, in the majority of instances, require shutdown of the separator for cleanout of the screen. Consequently, accepts chamber pressure sensor 120 monitors pressure in accepts chamber 80 and transmits signals through signal leads 122 to signal processor 130. Whenever the apparent liquid level in accepts chamber 80 falls to a preestablished level, immediately before the top of accept side of the screen 60 can begin to become unflooded, the signal preferably triggers an alarm 160 through leads 162 thereby alerting an operator of the discrepant operating condition so that appropriate corrective action can be taken. However, it may also be used to trigger backwash flow through screen apertures 61 from backwash nozzles 64, or to temporarily override, through leads 182, the normal control signals to accepts outflow control valve 140 causing it to close. Thus, accepts chamber low level alarm 160, shown schematically in FIG. 2, may produce an audio/visual alarm and/or a control signal to backwash nozzles 64 and to accepts outflow control valve 140 to eliminate screen blinding, if any, and to bring the accepts chamber and the screen basket 60 back to a flooded condition thereby eliminating excessive pressure drop across screen 60 attributable to non-balanced centrifugal force.

The invention described provides real time dynamic control of screening chamber liquid level in rejects separators in response to changes in feed flow rate and in response to partial blinding of openings of screen apertures 61. Overflows to the knot discharge chute are prevented as well as blinding of screen apertures induced by low liquid level and non-flooded screen apertures 61 on the accepts side of the screen 60.

What is claimed is:

1. A liquid level control apparatus for a knot drainer, comprising:

means for establishing an inlet liquid level set point;

means for sensing apparent inlet liquid level within said knot drainer;

means for comparing said inlet liquid level set point to said sensed inlet liquid level, and for transmitting a signal having an appropriate sign and a magnitude proportional to a difference, if any, between said inlet liquid set point and said sensed inlet liquid level;

means, in an accepts discharge line, for establishing a minimum liquid level within the knot drainer irrespective of variations of feed flow rate and accepts outflow rate, the means comprising a siphonic loop in the accepts discharge line; and means, responsive to said transmitted signal, for regulating an accepts outflow rate from said knot drainer.

2. A liquid level control apparatus for a knot drainer, comprising:

means for establishing an inlet liquid level set point below a knot discharge outlet and above an accept chamber of said knot drainer;

means for sensing apparent inlet liquid level within said knot drainer;

means for comparing said inlet liquid level set point to said sensed inlet liquid level, and for transmitting a signal having an appropriate sign and a magnitude proportional to a difference, if any, between said inlet liquid level set point and said sensed inlet liquid level;

means responsive to said transmitted signal, for regulating an accepts outflow rate from said knot drainer; and pressure sensing means in said accepts chamber for monitoring apparent accepts chamber liquid level and for thereby detecting incipient blinding of perforations of a rejects separation screen bounding said accepts chamber.

3. A liquid level control apparatus for a knot drainer, comprising:

means for establishing an inlet liquid level set point;

means for sensing apparent inlet liquid level within said knot drainer;

means for comparing said inlet liquid level set point to said sensed inlet liquid level, and for transmitting a signal having an appropriate sign and a magnitude proportional to a difference, if any, between said inlet liquid level set point and said sensed inlet liquid level;

pressure sensing means in said accepts chamber for monitoring apparent accepts chamber liquid level and for thereby detecting incipient blinding of perforations of a rejects separations screen bounding said accepts chamber;

means, in an accepts discharge line, for establishing a minimum liquid level within the knot drainer irrespective of variations of feed flow rate and accepts outflow rate; and means, responsive to said transmitted signal, for regulating an accepts outflow rate from said knot drainer.

4. The level control apparatus of claim 3, wherein the means for establishing a minimum liquid level comprises a siphonic loop.

5. A liquid level control apparatus for a knot drainer, comprising:

means for establishing an inlet liquid level set point;

means for sensing apparent inlet liquid level within said knot drainer;

means for comparing said inlet liquid level set point to said sensed inlet liquid level, and for transmitting a signal having an appropriate sign and a magnitude proportional to a difference, if any, between said inlet liquid level set point and said sensed inlet liquid level;

pressure sensing means in said accepts chamber for monitoring apparent accepts chamber liquid level and for thereby detecting incipient blinding of perforations of a rejects separations screen bounding said accepts chamber;

means, responsive to said transmitted signal, for regulating an accepts outflow rate from said knot drainer;

a siphonic loop means in an accepts discharge line for establishing a minimum liquid level within the knot drainer; and a barometric leg means for providing a vacuum action for rapid absorption of flow surges.

6. A liquid level control apparatus for a knot drainer, comprising:

means for establishing a minimum apparent inlet liquid level within the knot drainer irrespective of variations of liquid inflow and outflow rates during operation;

means for sensing liquid level within the knot drainer, for comparing the sensed liquid level to a set point liquid level, and for transmitting a signal having an appropriate sign and a magnitude proportional to a difference, if any, between said sensed liquid level and said set point liquid level;

pressure sensing means in an accepts chamber for monitoring apparent accepts chamber liquid level, thereby detecting incipient blinding of perforations of a knot separating screen surrounded by the accepts chamber;

signal processing means for receiving signals from said means for sensing liquid level and said pressure sensing means in said accepts chamber, for converting said signals to control signals and alarm signals, respectively, and for retransmitting said control and alarm signals, as appropriate;

means for receiving said alarm signal and for generating an alarm for indicating an apparent low liquid level in said accepts chamber; and valve means in an accepts discharge line for receiving said control signal and for regulating the outflow rate of accepts from the accepts chamber, accordingly.

\* \* \* \* \*